(12) United States Patent
Addante et al.

(10) Patent No.: US 8,402,100 B2
(45) Date of Patent: *Mar. 19, 2013

(54) EMAIL DELIVERY SYSTEM USING METADATA ON EMAILS TO MANAGE VIRTUAL STORAGE

(75) Inventors: Frank Addante, Los Angeles, CA (US); Tim McQuillen, Los Angeles, CA (US); Junior Shaitan, Pune (IN)

(73) Assignee: StrongMail Systems, Inc., Redwood City, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 12/758,732

(22) Filed: Apr. 12, 2010

(65) Prior Publication Data

US 2011/0040840 A1 Feb. 17, 2011

Related U.S. Application Data

(63) Continuation of application No. 10/857,601, filed on May 27, 2004, now Pat. No. 7,698,369.

(51) Int. Cl.
*G06F 15/16* (2006.01)
(52) U.S. Cl. ......... 709/206; 709/203; 709/204; 709/207
(58) Field of Classification Search ................... 709/203, 709/204, 206, 207
See application file for complete search history.

(56) References Cited

U.S. PATENT DOCUMENTS

| 6,334,140 | B1 | 12/2001 | Kawamata |
|---|---|---|---|
| 6,519,471 | B1 | 2/2003 | Yamaguichi |
| 6,526,436 | B1 | 2/2003 | Shiraishi et al. |
| 6,577,860 | B1 | 6/2003 | Yoshida |
| 6,850,968 | B1 | 2/2005 | Pfeffer et al. |
| 6,941,348 | B2 | 9/2005 | Petry et al. |
| 7,058,687 | B2 | 6/2006 | Kucherawy |
| 7,113,948 | B2 | 9/2006 | Jhingan et al. |
| 7,209,916 | B1 * | 4/2007 | Seshadri et al. ............. 1/1 |
| 7,693,866 | B1 * | 4/2010 | Weaver et al. ......... 707/999.107 |

(Continued)

FOREIGN PATENT DOCUMENTS

| EP | 1071029 A2 | 1/2001 |
|---|---|---|
| WO | WO 02/13470 | 2/2002 |

OTHER PUBLICATIONS

Communication pursuant to Article 94(3) EPC in European Application No. 05 755 938.7 dated Dec. 8, 2009.

(Continued)

*Primary Examiner* — Djenane Bayard
(74) *Attorney, Agent, or Firm* — Morgan, Lewis & Bockius LLP

(57) ABSTRACT

E-mail system which organizes e-mails into queues based on their locations and characterizes the e-mails. Metadata, indicative of the e-mail, is appended to the e-mail. The queues are organized based on the metadata, and processed. The metadata is always stored in local storage; and the message body may be stored in local storage, or in remote storage, depending on how long it will be until the message is sent. A special server manages whether the information is stored in local or remote storage.

20 Claims, 15 Drawing Sheets

U.S. PATENT DOCUMENTS

| | | |
|---|---|---|
| 2002/0147780 A1 | 10/2002 | Liu et al. |
| 2003/0018727 A1 | 1/2003 | Yamamoto |
| 2003/0028580 A1 | 2/2003 | Kucherawy |
| 2003/0105825 A1 | 6/2003 | Kring et al. |
| 2003/0117664 A1 | 6/2003 | McCarthy, Jr. |
| 2003/0135573 A1 | 7/2003 | Taylor |
| 2003/0158905 A1 | 8/2003 | Petry et al. |
| 2003/0195937 A1* | 10/2003 | Kircher et al. ............. 709/207 |
| 2004/0078580 A1 | 4/2004 | Hsu et al. |
| 2004/0128355 A1 | 7/2004 | Chao et al. |
| 2005/0198169 A1 | 9/2005 | Holten et al. |
| 2005/0204009 A1* | 9/2005 | Hazarika et al. ............ 709/206 |
| 2006/0053200 A1 | 3/2006 | McCown |
| 2006/0129592 A1 | 6/2006 | Poozhiyil et al. |
| 2007/0156830 A1* | 7/2007 | Petry et al. ............. 709/206 |

OTHER PUBLICATIONS

IPER for International Patent Application PCT/US2005/019223 dated Nov. 29, 2006.

International Search Report and Written Opinion for International Application PCT/US2005/019223 dated Sep. 5, 2006.

Process Software et al., "PMDF System Manager's Guide" Online, Sep. 2001; pp. 33-1-33-7.

SuperSpeed Software Inc. White Paper: "Increasing Performance in the Mission Critical Environment", SuperSpeed, Nov. 29, 2001, pp. 1-12.

* cited by examiner

```
         FROM:   X - PRIORITY
            TO:  X - QOS
                 X - VID
                 X - SERVICE
                 X - LOC
                 X - HIST
```

WORK FLOW

STORAGE

1201 — 1. INODE SERVER IS UP AND RUNNING.

1210 — 2. MULTIPLE PSTORES REGISTER WITH INODE SERVER

1220 — 3. NEW MESSAGE IS RECEIVED ON MTA. MTA PUSHES MESSAGE INTO QUEUE, ALSO FLAGS REQUEST FOR DISK STORAGE.

1230 — 4. DISK STORE WORKERS IN NEXT CYCLE PICK MESSAGES TO BE PERSISTED AND REQUEST NEW STORE TO INODE SERVER.

1235 — 5. INODE SERVER CREATES META-DATA AND FIND NEXT FREE PSTORE TO PROCESS ACTUAL MESSAGE STORAGE

1240 — 6. MTA DISK QUEUE WRITERS WRITE THE MESSAGE TO INDICATED PSTORE. SUCCESSFUL WRITE IS CONCLUDED WITH PSTORE STORE CONFIRMATION ID.

1245 — 7. STORE CONFIRMATION ID IS GIVEN TO INODE SERVER.

1250 — 8. MESSAGE RECEIVED CONFIRMATION IS PROVIDED TO DELIVERING AGENT. THIS STEP IS OPTIONAL. IT WILL SLOW DOWN AS WE WILL COMMIT ACCEPTANCE OF MESSAGE ONLY AFTER MESSAGE IS ACTUALLY STORED IN PHYSICAL STORE.

THIS COMPLETES STORAGE REQUEST

FIG. 12

1300 FORM QUEUES

QUERY

1320
1. QUEUE MANAGER IN MTA KEEPS ON MONITORING REQUEST PATTERN ON QUEUES. IT WILL MANAGE A CERTAIN QUEUE STATE DEPENDING ON POLICY FOR MTA FOR E.G. QUEUE SIZE 500M ETC.

1325
2. QUEUE MANAGER WILL ALSO TRY TO PREDICT REQUEST PATTERN FOR NEXT 1 - 2 CYCLE. IT WILL GET QUEUE FILL WORKERS TO PRE-FETCH REQUIRED MESSAGES IF NOT AVAILABLE IN MEMORY FROM PSTORES.

1330
1. QUEUE MANAGER REQUESTS INODE SERVER FOR MESSAGES - e.g. OF SUCH QUERY COULD BE GET MESSAGE-ID x123-y123 OR GET 10 HOTMAIL MESSAGES ETC.

1340
2. INODE SERVER RETURNS MESSAGE SOURCE (ACTUAL PSTORE) FOR FETCH. UPDATES INTERNAL DATA STRUCTURE TO LOCK THE MESSAGES. THE LOCK WILL BE TIMED OUT BASED ON CONFIGURATION AND WILL AVAILABLE TO ANY OTHER MTA IN CASE IF NON-COMMITMENT OF EITHER FAILURE OR SUCCESS FROM REQUESTING MTA.

1350
3. QUEUE MANAGER READS FROM ACTUAL PSTORE MESSAGES AND MESSAGES ARE AVAILABLE FOR DELIVERY.

4. ALL MESSAGES WILL CONTAIN STORAGE STATE - IF THE MESSAGES AVAILABLE IN STORAGE; THE MESSAGE BODY CAN BE DELETED TO MAINTAIN REQUIRED QUEUE STATES SUCH AS MEMORY CONSTRAINTS ETC.

*FIG. 13*

EMAIL DELIVERY SYSTEM USING METADATA ON EMAILS TO MANAGE VIRTUAL STORAGE

CROSS-REFERENCE TO RELATED APPLICATIONS

This application is a continuation of U.S. patent application No. 10/857,601, filed May 27, 2004, now U.S. Pat. No. 7,698,369 which is hereby incorporated by reference herein in its entirety.

BACKGROUND

Our co-pending application, U.S. patent application No. 10/777,336, filed Feb. 11, 2004, describes an advanced e-mail system with a number of new and advanced features. The e-mail system described therein obtains increased speed characteristics by organizing e-mails into specified kinds of queues formed within nonpersistent storage. Nonpersistent storage is much faster than disk storage, and hence this may substantially increase the I/O speed. In addition, the queues themselves may allow for more efficiency.

The system also describes various characteristics of load balancing and license authorization to improve the efficiency of sending emails. A detailed description is found in our co pending application, the contents of which are incorporated by reference herein.

SUMMARY

The present application describes additional aspects of an e-mail processing system, which includes new and special characteristics.

One aspect includes using metadata as part of the message, where the metadata includes routing and status information for the message.

BRIEF DESCRIPTION OF THE DRAWINGS

These and other aspects will now be described in detail with reference to the accompanying drawings, wherein.

FIG. 12 shows a flowchart of the workflow operation;

FIG. 13 shows a flowchart of the query operation;

DETAILED DESCRIPTION

The present system describes an improved e-mail handling and transferring system.

Initially, the description given herein is a description of software modules which run on a general-purpose computer, such as a workstation type computer or a computer based on the x86 architecture. However, it should be understood that the description is given herein could operate as hardware, for example based on the dedicated circuitry, or in FPGA components, with the functions being defined in hardware definition language. While the description given herein is of software, the inventors intend this description to similarly cover hardware devices which operate in comparable ways to that described herein.

Figure 1:
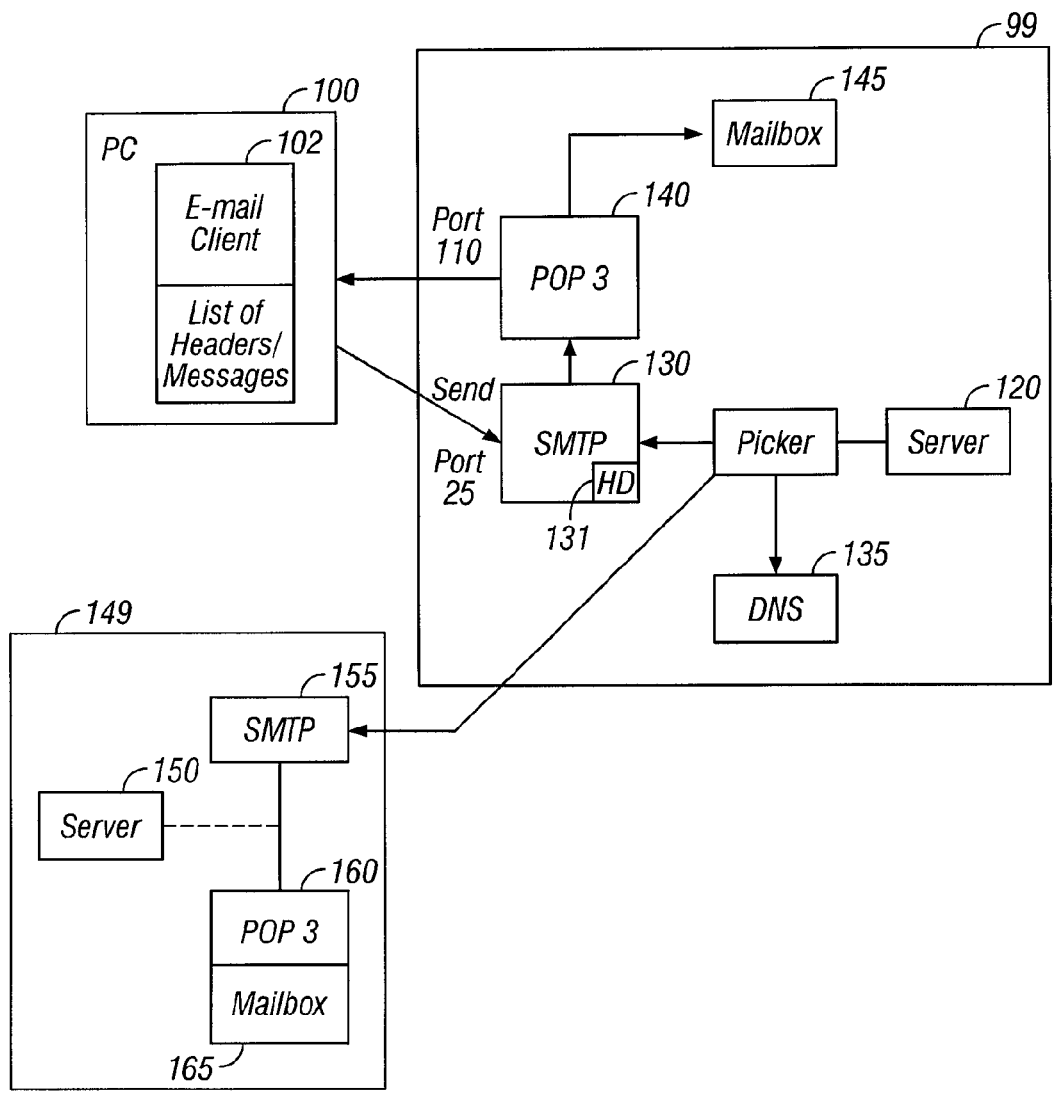
FIG. 1 shows a diagram of e-mail flow.
Figure 2:
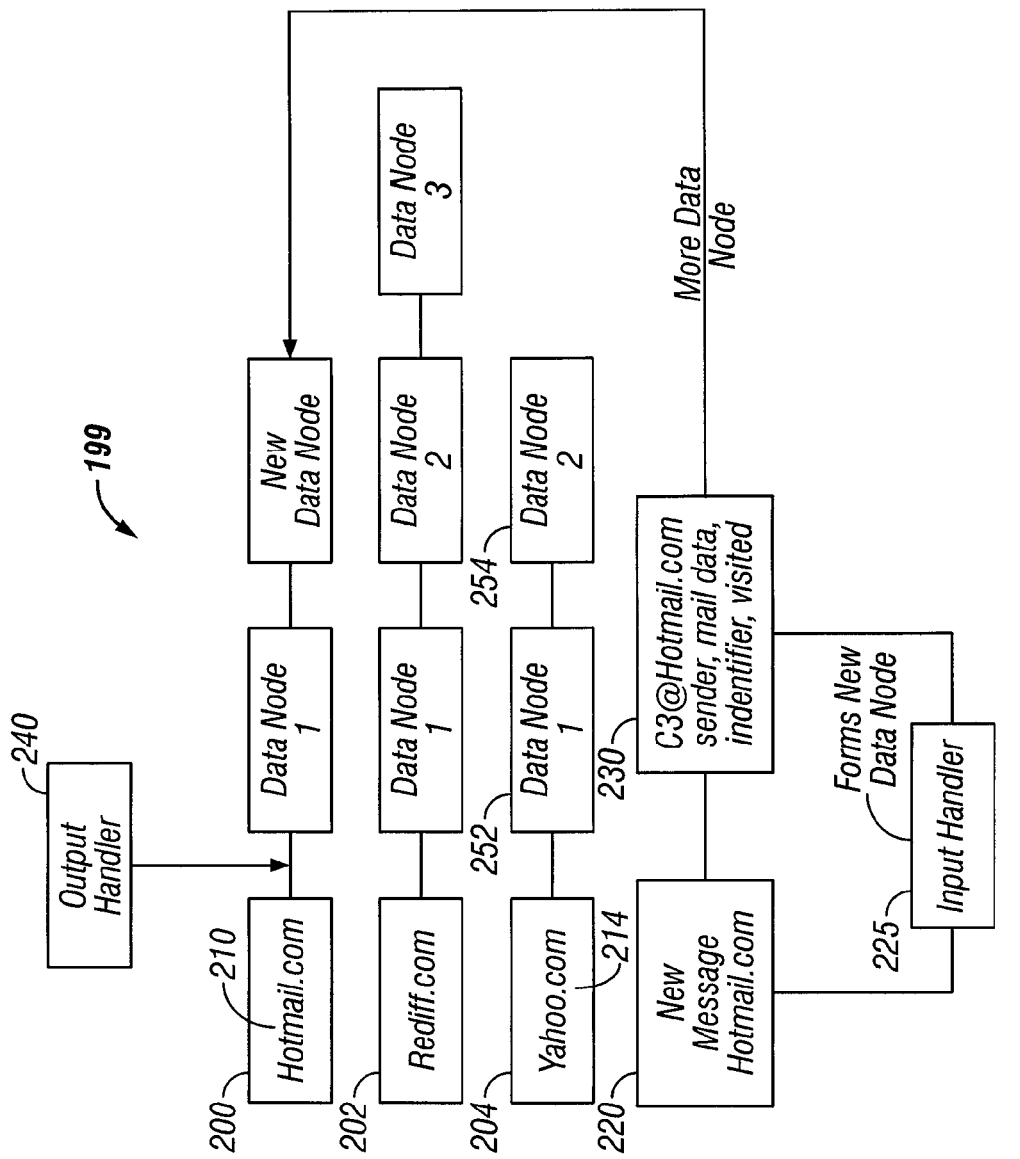
FIG. 2 shows a diagram of the queues that are formed according to the present system.

FIG. 2 illustrates the formation and use of a message queue map. The message queue map is preferably formed in non persistent storage, e.g., random access memory running within a mail server, e.g., the server performing the SMTP function. In a preferred embodiment, the entire mail processing operation occurs in non-persistent memory of this type.

Prior systems have taught away from using non-persistent memory for the email processing. In fact, the use of non-persistent memory could cause significant problems when and if the system crashes during operation. The present system, however, teaches a way to avoid loss of functionality during a crash, by storing information about which emails have been processed, and the state of processing of these emails. An aspect describes a very efficient way to save that state.

The queue map which is shown in FIG. 2 has a number of message queues shown respectively as 200, 202 and 204. Each of the message queues is defined based on various variables that may include domain name, systems user (in case of virtual servers). In simplest version of queue, it is associated with a specific domain. For example, message queue 200 is associated with domain 210 which is Hotmail.com. Message queue 204, intended for yahoo.com (domain 214), includes two different data nodes 252, 254, which are each intended for delivery to domain yahoo.com. Each data node represents personalized information about the e-mail to be sent.

Figure 3:
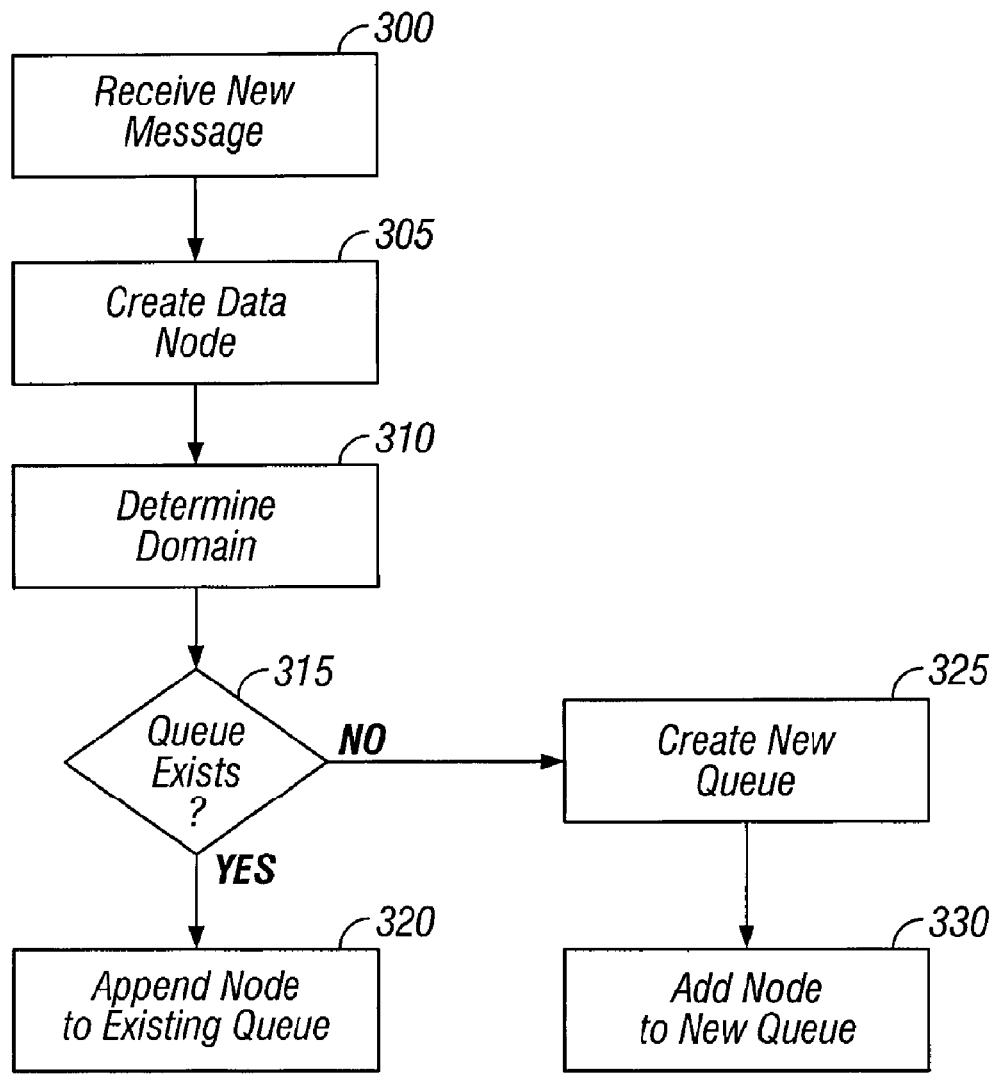
FIG. 3 shows a flowchart of creating and handling the queues.

A new message 220 is also shown. As part of the operation, this new message needs to be added into the existing queue map. An input handler shown as 225 may operate as shown in the flowchart of FIG. 3. At 300, the process receives the new message 220. The input handler operates, at 305, to create a data node 230 as a digest representing the message. A data node in this embodiment is an object that represents one message. The data node includes information about the message being sent; and may include the recipient, sender, data about the email, domain, a unique session identifier, visit count, and other information for Quality of Service ("QoS") guarantees and routing specifics. Note that the nodes are not the emails themselves—rather they are just pointers to the emails as stored in memory.

The data node is analyzed to determine the appropriate queue (function of domain and miscellaneous variables) at 310. Step 315 determines if a message can be appended to existing queue. If so, then the data node is appended to the existing queue at 320.

For example, here the new message 220 is intended for the domain 210 of Hotmail.com. Therefore, the data node 230 is appended to the end of the existing queue 200.

In the alternative, if the node cannot be put into an existing queue at 315, then a new queue is created at 325, and the data node 230 is appended to the newly created queue at 330. In this way, multiple queues are formed, each relating to nodes representing messages with similar routing strategies. Multiple queues may be provided for each queue variable if the existing queue has more than a maximum number of messages.

Since each queue represents messages that will require the same processing strategy such as delivery to the same domain, the entire queue of messages can be sent at once, thereby streamlining the sending process.

Figure 4:
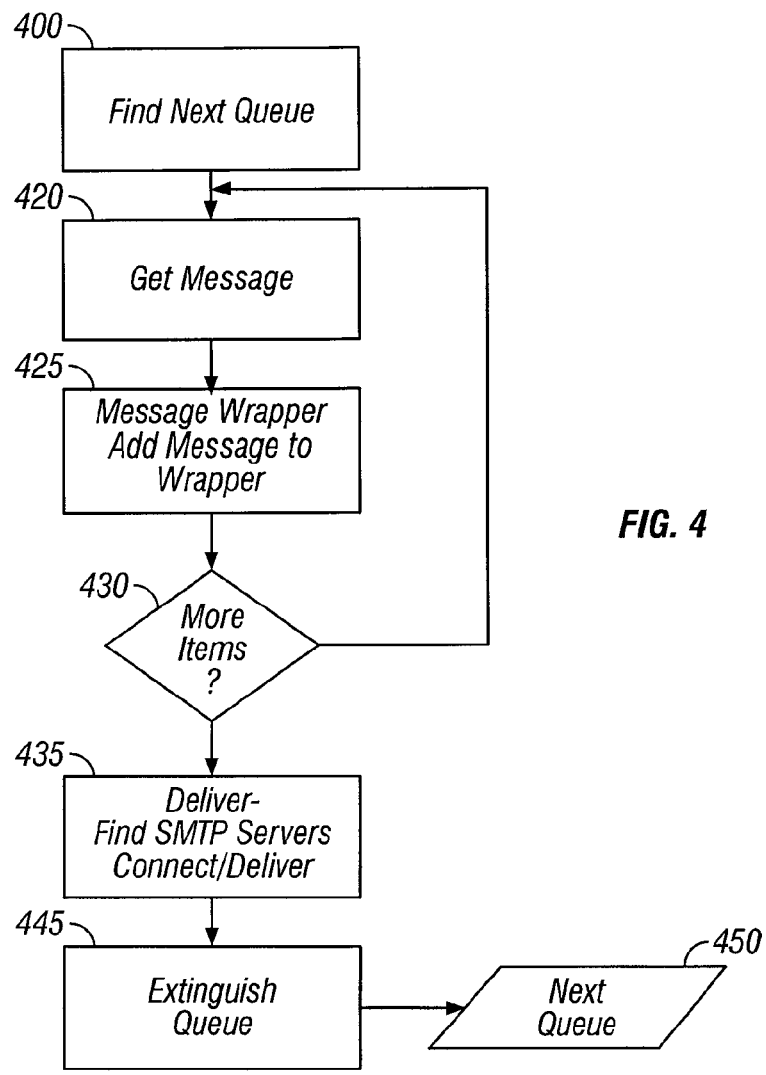
FIG. 4 shows a flowchart of processing the messages within the queues.

A command set, shown here as the output handler 240, can operate on the messages and queues according to the flowchart of FIG. 4. Each data node represents a particular message. The output handler processes the data node in order to send the mail to the intended recipient. The output handler 240 is shown as being a single process, but multiple processes may be operated at once, with, for example, each process handling a single queue at any one time or using a pipelined or multi-threaded system.

The process starts at 400, where the output handler looks for the next queue to process. This may be done in round-robin fashion, where each queue is assigned a number (n) for example, and the system simply looks for n+1 queue, where a maximum n of queues can exist. An alternative system is that the output handler always handles the queue with the greatest number of message nodes therein. In this example, queues are sorted according to their length and in that case, step 400 finds the longest queue or the next full queue. In another embodiment, however, the amount of time that the queue has existed may also be taken into account. In other words, the longest queue would be sorted first unless that longest queue had not been processed for a specified time such as X minutes.

In a current queue at 420, the message is found, removed from the queue and processed for delivery. A message wrapper is formed at 425, which may include multiple messages within the wrapper. Each of the messages within the wrapper has its own personalized content, but the common parts of the messages (such as the domain information) are provided by the wrapper itself. This may provide further streamlining of the process.

Block 430 determines if there are more items with the queue that can go within the same wrapper and, if so, gets the message at 420 and adds it to the wrapper at 425. After the queue is finished, processing is carried out by 435 which shows locating an SMTP server for the recipient domain, making a connection to the SMTP server, sending protocol tokens representing the message, and then delivering the messages.

Once all of the messages in the queue have been removed, then the queue is removed from the memory map, or extinguished, at 445. If message processing fails due to a recoverable error, then the message may be pushed back into the queue, or into a new queue indicative of the same domain. Each time the message delivery fails, the "visit count" is incremented. Message failure may occur due to the recipient servers being unavailable, e.g. busy or inaccessible. Processing then moves to the next queue at 450.

Figure 5:
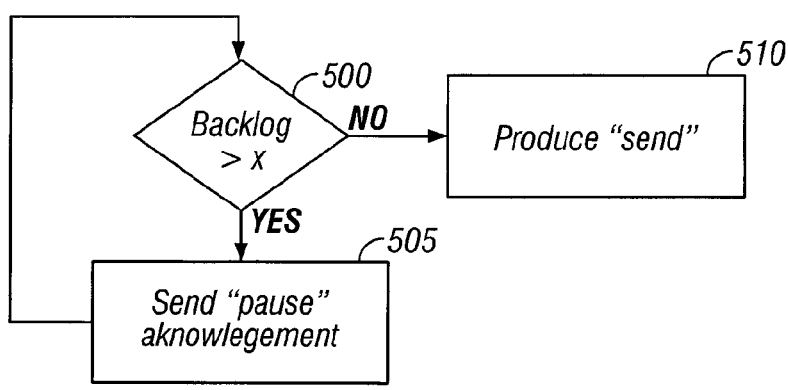
FIG. 5 shows a flowchart of one aspect of the load balancing.

An overflow prevention is shown in the flowchart of FIG. 5. Overflow may occur if messages are received faster than the queuing agent 225 can handle the messages. At 500, the input handler detects that it has a backlog which is greater than a specified amount, for example, 1000 messages, or if the size of the message queue will take longer than a specified time to process, such as 3 seconds. At 505 the input handler sends a "Pause" acknowledgment to the message server that is receiving the messages, e.g., the SMTP server. The pause acknowledgment indicates to the message server that it should stop sending messages that it has received. This causes the message server to save the received messages until the backlog is reduced.

The loop continues to check the backlog at 500. If the number of messages in the queue has fallen below the size limit at 500, then the relay server sends a "send" acknowledgement to the message server at 510. This allows the message server to start sending messages again.

The server application 702 may be able to transmit certain e-mail messages to certain domains quicker than others. In this case, the load balancer 732 may pass more e-mails for the faster domains to the server 702 than it does for the slower domains. The statistics polling process 764 and listener processes may carry this out. In this way the message server effectively adjusts the feed rate according to the rate at which the relay servers are performing. This may allow the system to take into account slower relay servers, and prevent blocking of messages by slower relay servers.

The basic load-balancing is made by the following steps:
get the next message parameter;
generate the full header and body with personalization;
query the current load conditions and compute delivery rates for the messages;
compute whether the system relay is ready for new messages; and
if so, push the messages.

In this way, the input handler receives the messages only when it can handle the messages. This provides one aspect of basic load balancing.

Figure 6:
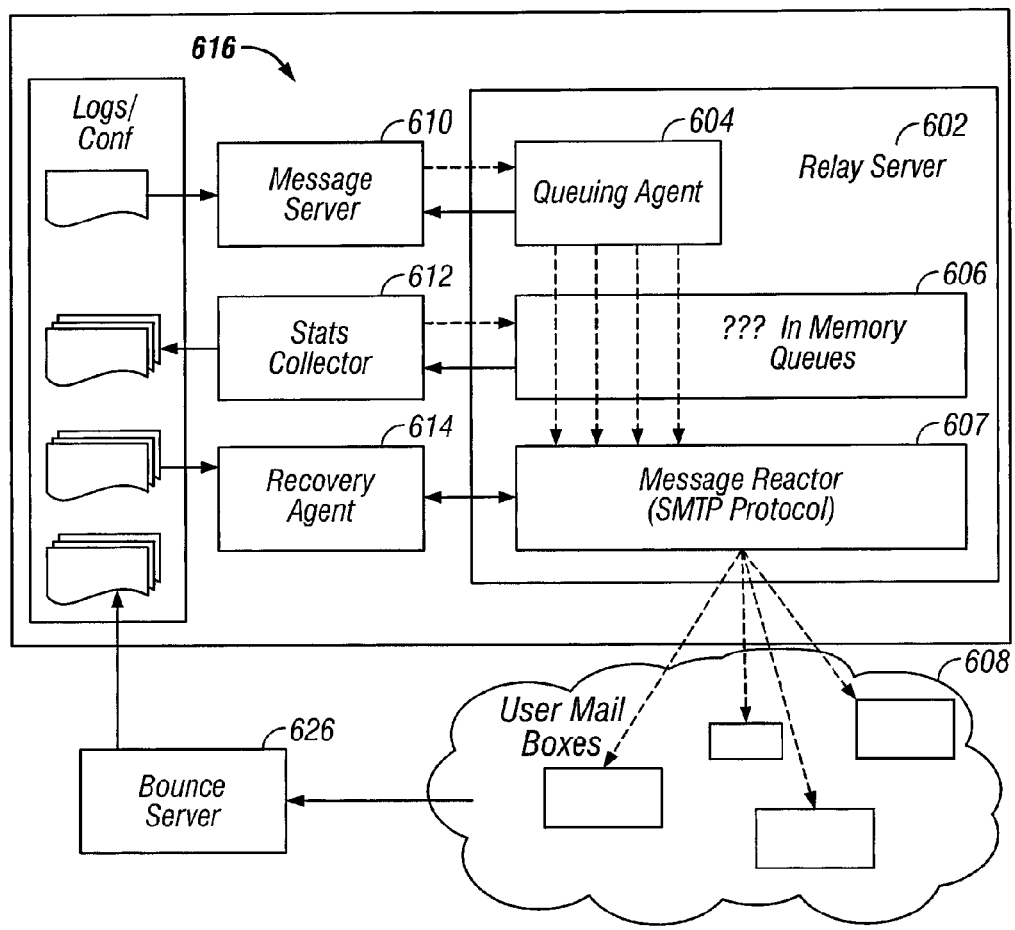
FIG. 6 shows a block diagram of the queues and agents handling the queues.

FIG. 6 shows a basic block diagram of the e-mail messaging system. A relay server 602 carries out the functions of handling the input messages. The relay server 602 includes a queuing agent 604, as well as a memory queue statistics element 606 and a message reactor 607. The message reactor 607 can be an SMTP server or a server that carries out comparable functions or a device that interfaces to an existing SMTP server.

The message reactor 607 delivers the messages to the user mailboxes 608. Bounce server 626 detects any messages that are intended for mailboxes which do not exist, and "stores" those messages for further processing.

An input parser 616 receives and characterizes the messages. Parser 616 includes a message server 610, statistics collector 612 and recovery agent 614. Each of these functions can be carried out in RAM or nonpersistent storage in order to facilitate the processing. The recovery agent stores snapshots of system variables to persistent storage, to allow the system to recover from a computer crash. In an alternative, although perhaps less preferred embodiment, however, queues or parts of queues can be maintained on a disk drive. The functions of these elements will be described in further detail herein.

Figure 7:
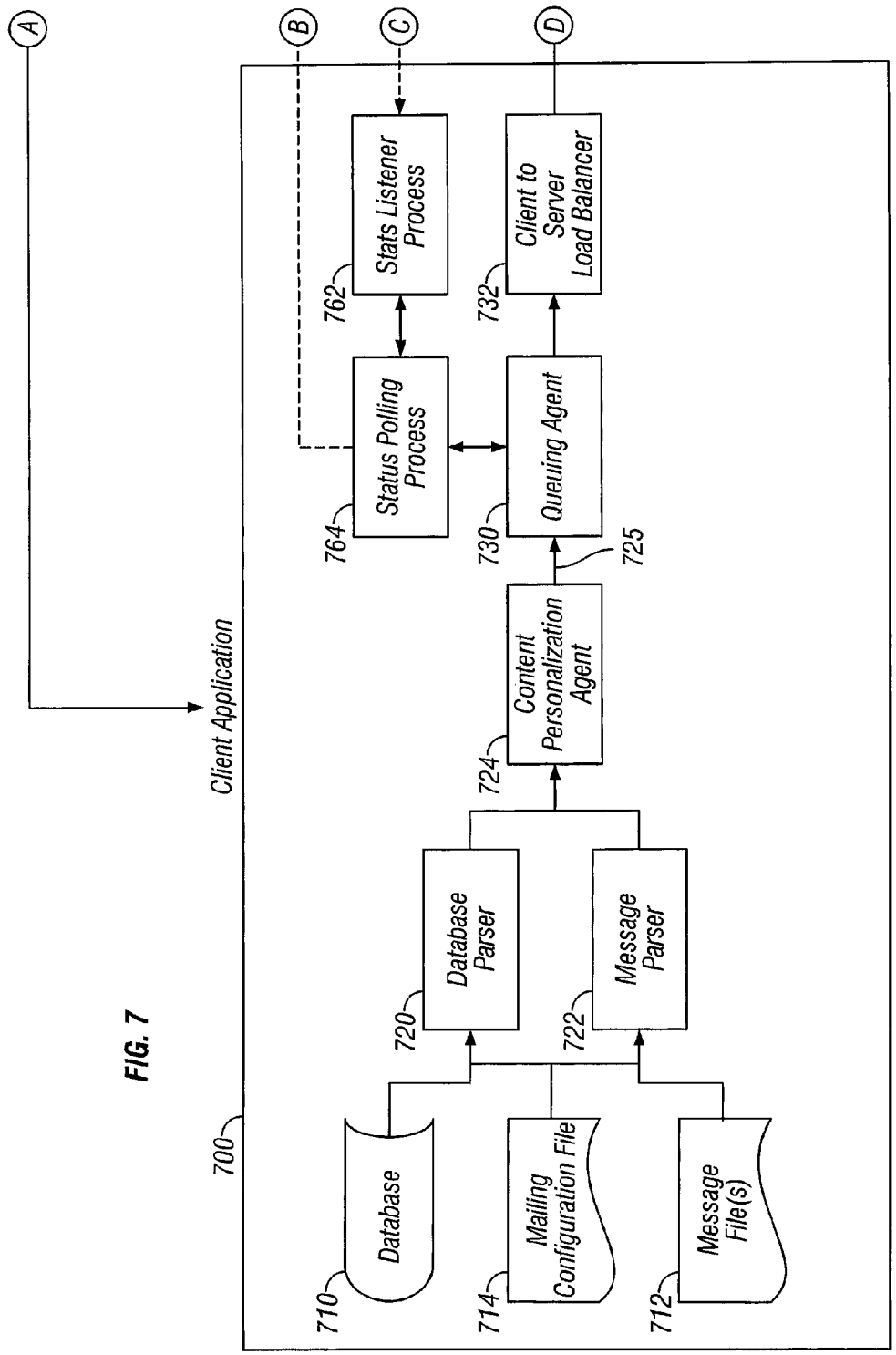
FIG. 7 shows the different functional elements that make up the operating program.
Figure 7:
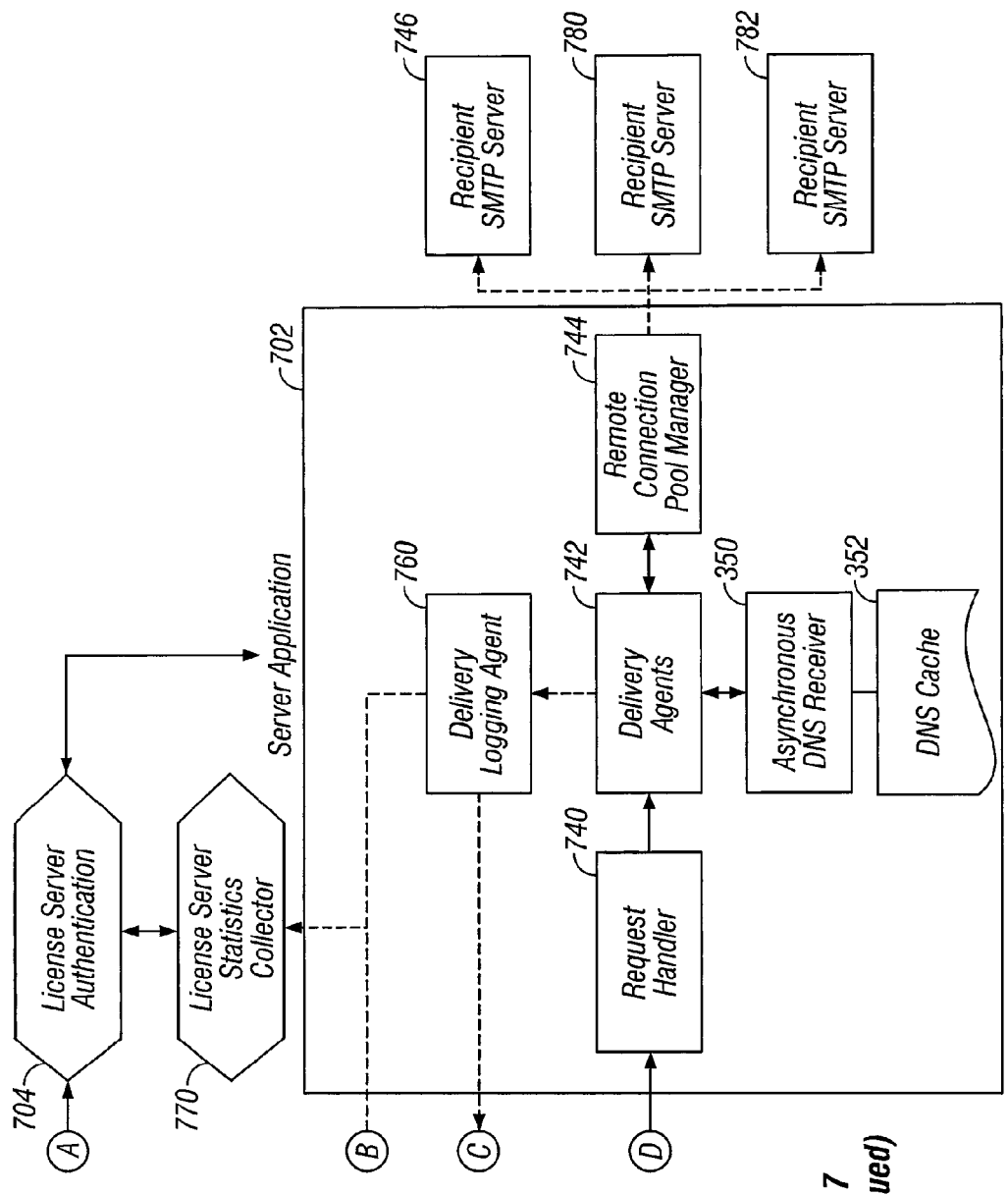

FIG. 7 is a flowchart of the passing of messages between the client, server and license server authentication unit.

The client application is shown as 700, and this may be for example, an e-mail client operating in a user's computer. The client application 700 creates personalized messages of a conventional type, and controls and commands sending those messages to the server. This is done using a number of agents; all of which may operate in software.

In the client application 700, a number of different processes cooperate together in order to form and send an e-mail. A message files database 712 represents the specific message files which are being sent, that is, the text and/or attachments that form the unique parts of the e-mail. The other parts that may be used for many different e-mails, are stored in a file, such as databases 710,714. A database 710 provides the e-mail addresses. Mailing preferences, including mailing information and the like for the recipient of the e-mail, are stored in the database 712. These two databases are used in conjunction with the mailing configuration file 714 that stores tracking information for the resulting e-mail.

The nodes, such as 252 shown in FIG. 2, may be pointers to areas in the message file 712 and/or areas in the database 710 and configuration file 714. In addition, each e-mail may be assigned with a unique ID formed from a bit vector of the queued e-mail. The bit vector may be stored in persistent storage. The bit vector may include sufficient information to reconstruct the message and the state of processing of each of the e-mails. This information is stored on disk or persistent storage. This enables recovering the entire state of processing of the system, without storing the entirety of the e-mails to disk.

Only certain data representing the contents of the e-mails, the locations in memory, and the like are stored. For example, the message IDs of each of the messages in each of the queues may be recorded periodically in order to save the state. If the relay server goes down for any reason, then the IDs of the messages that were currently being processed are recorded. The crash is remedied by starting a new message server to transfer these non-processed messages to other relay servers in the set up. If all relay servers go down simultaneously, the undelivered message IDs remain recorded, and can be sent by the system.

The e-mail address records in the database 710 are processed by a database parser 720 along with the contents of the mailing configuration file 714. Correspondingly, the message records in the message database 712 are processed by a message parser 722. The two parsers 720 and 722 act on the database records and pass parsed content to the personalization agent 724. This agent combines the parsed information from the address record with the parsed message. In one embodiment, the parsed message may be formed by a message template, filled in with tokens from the message list parameters, for example the parameters that are shown in element 230 in FIG. 2. The personalized content such as the name or other information is inserted into the output messages based on the personalization.

An e-mail message is created using the contents of the personalization agent 724 to create a message wrapper, which includes the message from the message parser 722 within the parsed address from the database parser 720 to create a personalized message 725. The resulting address is preferably manipulated solely within random access memory to enable quicker handling.

The personalized message 725 is then passed to a queuing agent 730 which takes the message input and queues it in the appropriate queues. The queues may be formed as described previously with reference to FIG. 2. The e-mail is generally queued according to the domain that will receive the e-mail. Often used domain names may receive multiple queues.

A client-to-server Load balancer 732 monitors the queues to ensure that the server 702 is not overwhelmed by incoming e-mails, as described above with reference to FIG. 5.

The server application 702 uses request handler 740 to take the messages and deliver the messages to one or more delivery agents 742. While only one delivery agent is shown, there may be many such agents. These delivery agents 742 communicate the e-mail messages to a remote connection pool manager 744 that manages a number of remote connections.

The remote connection pool manager 744 establishes, maintains and terminates connections with remove SMTP servers shown as 746, 780 and 782.

The remote connection pool manager 744 may maintain the connections with the recipient SMTP servers directly; taking the burden of doing this off of the SMTP server at the local ISP.

The remote connection pool manager 744 also uses asynchronous DNS receiver 350 which operates from an off-line line queue or cache 352 that is periodically updated. The DNS lookup may be asynchronous relative to the remaining parts of the message delivery. In this way, the lookup of DNS information from the DNS cache 352 can be performed in parallel with other parts of the message delivery.

The delivery agent or agents 742 are also in communication with the logging agent 760, which forms a monitor process to monitor which e-mails have been sent. This may enable complete recovery in the case of a system crash.

The mailing configuration file 714, the database parser 720 and message parser 722 operate on a predictable and logical basis. Therefore, by knowing where e-mail transmission was interrupted, the point that existed at the time of any system crash can easily be recovered.

The logging agent 760 also communicates with the statistics listener processes 762 and the statistics polling process 764. The logging agent 760 monitors successful and unsuccessful e-mail transmissions. Unsuccessful transmissions may occur when a remote server is unavailable or an unsuccessful DNS resolution occurs. The status polling process 764 is also in communication with the queuing agent 730 and maintains a record of the last outgoing message. In this way, an interrupted mail stream may be re-established at the point of interruption.

The listener process 762 logs or provides information about successful e-mail transmissions. In an embodiment, the information about e-mails, in the list, is listed by reference only. For example, the listener process 762 may indicate which can be successfully delivered. This also maintains information or logs about rejected e-mails. The e-mails may be rejected in complete form, so that forensic analysis may be performed to determine how the failure arose.

The logging agent 760 may also indicate when the e-mail was clicked on or opened.

The logging agent collects and aggregates e-mail information from multiple sources and may also be in contact with a license server statistics collector 770, and also in contact with a license server authentication process 704. The license server authentication is also in communication with both the server and client.

The concept of license authentication is entirely a new paradigm according to the present system. The statistics collector 770 collects statistics about the number of messages that are processed by this system. In an embodiment, the server authentication 304 determines whether a user has paid appropriate license fees sufficient to cover the number/type of messages which have been sent. The server authentication 304 may refuse to send messages or may send warnings based on the number of messages having been exceeded. In this way, this software may operate effectively as pay-per-use software. That is, the initial software may be sold with some number of messages enabled. This may enable users to evaluate the software, almost as shareware, for a certain period of time. They may install it, and it will operate as desired until the specified number of messages is reached. After that, the user needs to pay additional license fees to process additional messages.

Second Embodiment

An alternative embodiment maintains some but not all of the e-mail information in nonpersistent storage using a special kind of virtual storage, and metadata associated with each message to detail the message storage information. Some information is written to persistent storage, and other information is maintained in the nonpersistent storage. This may strike a better balance of trade offs. Non-persistent storage may be more expensive, and needs some mechanism, as disclosed in the first embodiment, to back up actions in case of system failure. However, nonpersistent storage is faster, and may lead to a faster overall system. This second embodiment may store only certain information, therefore, in the non persistent storage; and specifically only the information which is likely to be processed within a specific processing time, e.g. one cycle of operation or two cycles of operation or the like. This second embodiment also includes improved functions carried out by the license server.

In the first embodiment, all e-mail processing was carried out in nonpersistent storage. In this second embodiment, virtual storage is used, which may include a combination of local storage, that is storage within the server itself, and non local storage, which may be storage external to the server. In an embodiment, the local storage may include nonpersistent storage, and the nonlocal storage may include the disk drives and other persistent storage.

An "Inode" server is used along with the message transfer agents to maintain the virtual storage and a backup/recovery system for the information, in case of failure.

A delivery strategy is used to manage the messages and the queues. The message delivery may be carried out using any of the techniques described in the first embodiment. In this embodiment, however, the messages are associated with metadata that describe the state of processing of the messages. The messages are processed asynchronously based information within the metadata. Once processing is complete, the messages are queued, then placed into local storage and then sent.

Figure 8A:
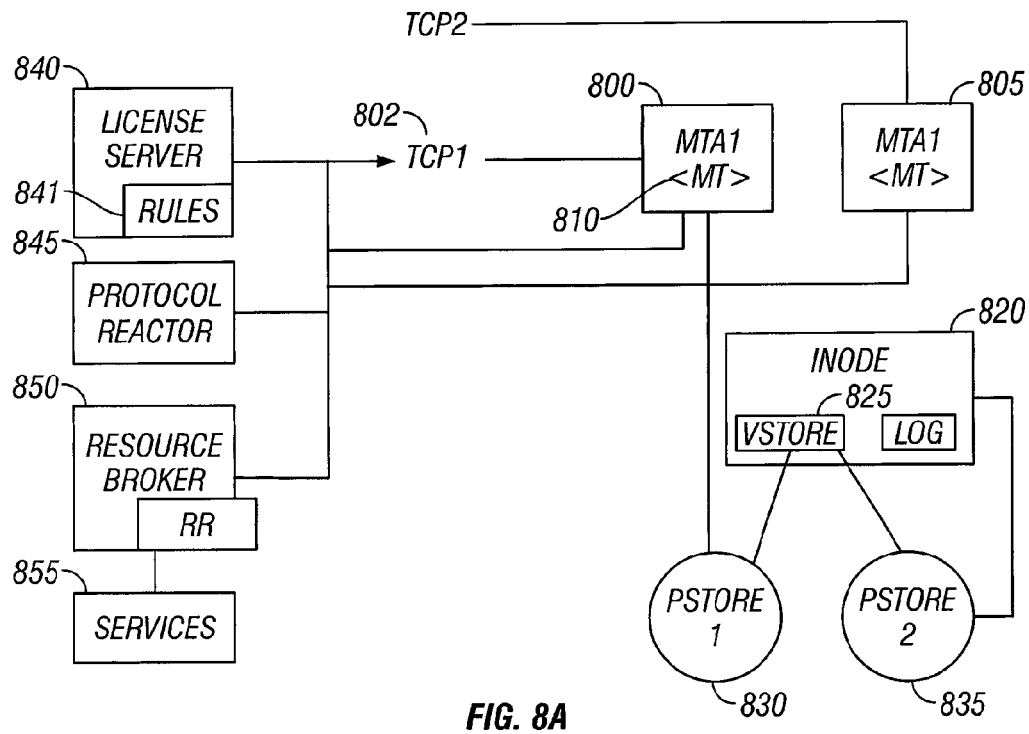
FIG. 8A shows a block diagram of a second embodiment.
Figure 8B:
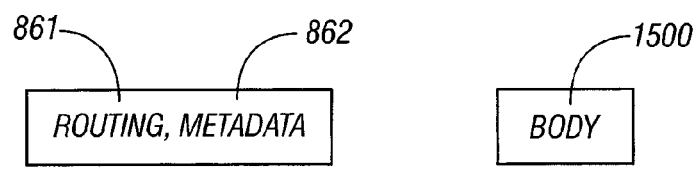
FIG. 8B shows a layout of an exemplary message of the second embodiment, showing its metadata.

FIG. 8A shows a block diagram of the embodiment. FIG. 8B shows the basic form of the message that is processed according to this embodiment. The message has two parts: the actual message body shown as 1500, message routing information 1510 which may include standard routing information such as the domain name, destination name and the like, and also includes metadata shown as 1520.

The routing portion 861 may include, as conventional, "from" address, the "to" address and the like.

The metadata includes additional information about the message. Different categories of metadata may be stored.

Service categories of metadata, for example, may describe different things that should happen to the message prior to, or after, sending.

Business categories can describe the form of the message, for example, its priority, maximum size, or the like.

History categories describe the history of the message, when it was received and what has been done with it, e.g., its state of delivery, and where the different parts of the message are currently being stored.

According to the present system, the e-mails are queued based on the metadata. The message handling agents described herein obtain the information about the e-mail from the metadata, rather than from the e-mail itself.

E-mail information may be received by the e-mail server in a form where it is not yet ready to send. For example, the e-mail may include an address of the form "Hotmail.com". This information cannot be used to send e-mail; rather, the DNS corresponding to this name must be found, typically via a DNS lookup. Until that DNS has been found, however, the message is not ready to send.

In other similar situations, a message may be received in a state where it is not ready for sending. As described herein, certain messages may require services such as virus check or the like. Until that service/operation has been done, the message is not ready for sending. In other cases, the recipient server of the message may only be able to receive messages at some specified rate, and other existing messages may be queued ahead of the current message. The load balancing described above may manage the rate of message sending.

The metadata is used to describe these conditions of the message. Exemplary metadata is shown in FIG. 8B, more generally, includes all message information from which the condition or state of the message can be determined. Metadata may include:

x-priority, which represents the priority of the message, e.g., high, low or medium.

Another metadata may include quality of service shown as x-QoS. The x-QoS may specify that delivery has to be done, for example, in no less than 30 minutes.

X-TOR may represent the time of receipt, so that the modules can determine how long it has taken since receipt.

Another metadata may be a virtual ID (x-Vid). Information may be sent from one server, attempting to make the e-mail look like it is originating from another server. The virtual ID makes the information appear to be originating from another address.

x-service-vs tells that the e-mail needs to be scanned for viruses; x-service-vs-c indicates that the virus scan is complete.

Another piece of metadata, shown as x-location, defines where specifically the message is located.

Another item of metadata, added by a sending agent which looks at all the metadata and its state of processing, is x-rts; or ready to send.

Metadata can therefore store any state the message has ever had during its processing.

Other metadata can include sender, accept time, retries, next retry strategy.

This metadata is used by the basic system in order to determine routing for the message. The basic system in FIG. 8A, shows the parts that manage the use of virtual storage. Unlike in the first embodiment, where absolutely all message information was maintained in nonpersistent storage, this embodiment maintains certain parts of the message information in local/nonpersistent storage with other parts being maintained in remote/persistent storage. Preferably, the nonpersistent storage also holds more information about the "imminent" messages, that is, the messages which will be sent within a predetermined period, e.g., within a certain number of operation cycles, e.g., the next cycle or two cycles. Some information about the non-imminent messages, those which will not be sent within the predetermined period, is stored in local storage. However, the local storage stores less information about the non-imminent messages, than it does about the imminent messages. Alternatives may be used to determine which messages are imminent, including defining messages as imminent based on time to send, priority, or other criteria. Preferably, the information maintained in nonpersistent storage includes at least the metadata about all e-mails.

The basic block diagram of FIG. 8A shows a message transfer agent 800. The message transfer agent 800 listens on a specified TCP port shown as 802. In addition, the message transfer agent is an "instance", so additional message transfer agents such as 805 may also be called. The message transfer agent stores a queue representing the information and e-mails it is processing, shown as 810.

The message transfer agent communicates with the virtual data storage manager, here called the Inode server 820. The Inode server maintains a list 825 of information that is in available physical stores ("pstores") and currently stored/in process messages. The Inode Server also maintains various logical representations of messages. This may include views such as a queue based view or a priority view. The actual message storage itself is maintained in the pstore.

The persistent storage is shown as the Pstore servers 830 and 835. In general, any number of persistent storage servers can be used for this function.

The message transfer agent also communicates with a number of additional services including the license server 840 which has been described above, but also in this embodiment carries out additional functions by interacting with a protocol reactor 845, and the resource broker 850. The resource broker manages the services, such as the antivirus and other services noted above, shown generally as 855.

Figure 9:
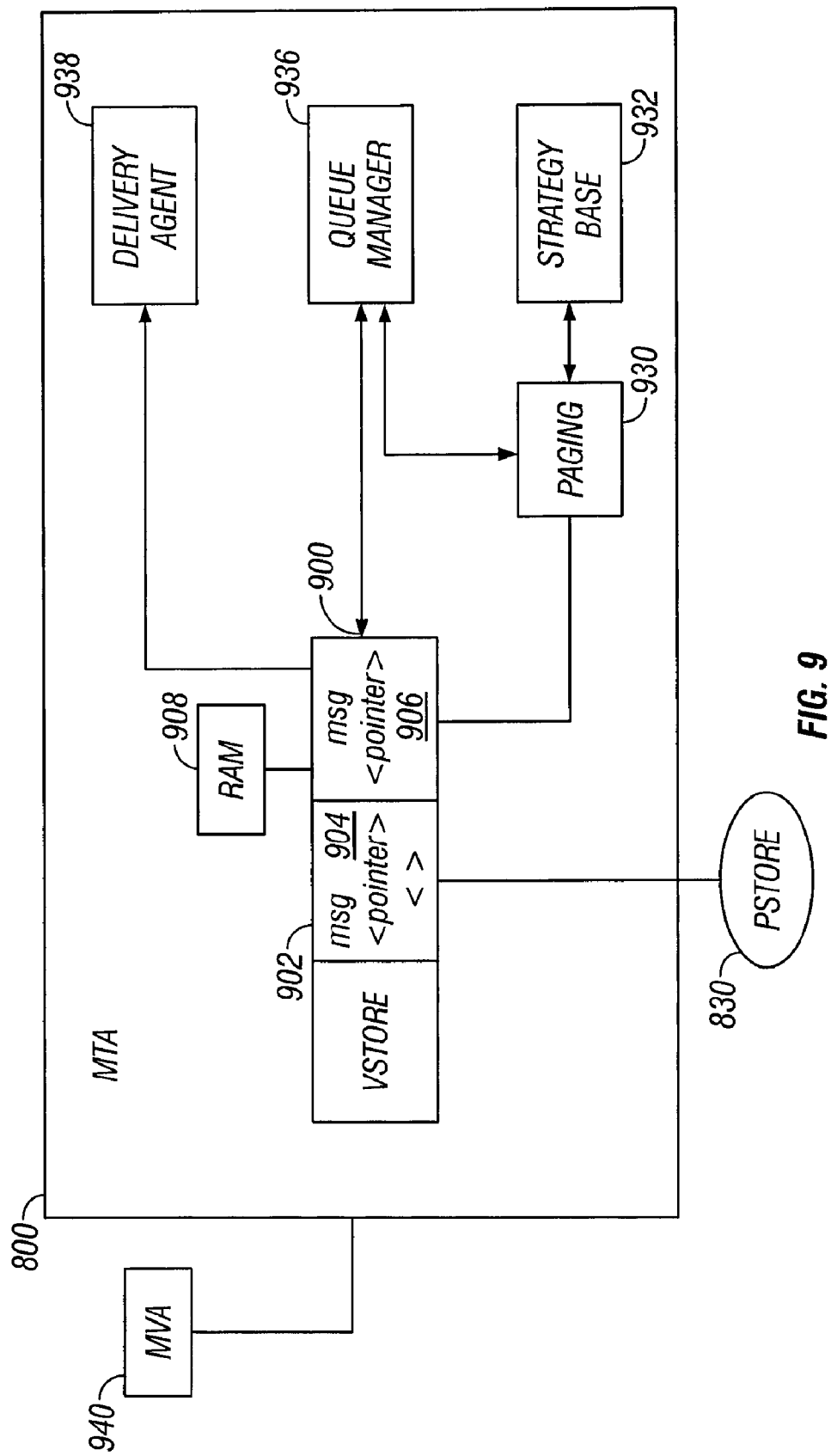
FIG. 9 shows a block diagram of the virtual storage of the second embodiment.

FIG. 9 shows further details about the message transfer agent 800. In operation, a special delivery agent 938 within the message transfer agent 800 stores message queues 810 for the messages that it is processing. The metadata within those queues is used to order the queues, and to determine the messages to be delivered. The delivery agent 938, as described herein, maintains everything necessary to decide how to and when to deliver the message. For example, messages with higher priority or delivery guarantees may be placed higher within the queues so that they are sent sooner. Quality of service may also be used to reorder the queue. The time since e-mail received may similarly be used to reorder the queue and also to determine if the messages are "imminent".

The message can be anywhere within the virtual memory and/or on any Pstore. This allows the delivery agent 938 to determine the different costs of maintaining the message in different locations. For example, if the cost and time of maintaining the message in memory is greater than the cost of maintaining on disk, then the message can be maintained in memory. This analysis is carried out by paging analysis based on stored "strategies" in strategy base 932.

The queue 900 within the message transfer agent also forms a virtual store object which may store messages such as 902, where each message includes different kinds of associated metadata including pointers to any part of the message that is stored in nonlocal memory such as Pstore 830. The pointer 904 may point to external storage such as the P store 830. Other pointers such as 906 may point to local random access memory such as 908.

The queue manager 936 and delivery agent 938 may manage the trade-off between the costs of keeping the different messages in the different kinds of memory and the operations which need to be carried out. For example, as described above, messages may not be ready to be sent immediately upon receipt. Messages which are in process can be classed as non-imminent, and stored in persistent storage until they are ready for sending. However, certain parts of the message are preferably always maintained in the random or nonpersistent storage. These parts preferably include at least the message routing information and the metadata. Note, however, from the above that one item of metadata is an actual pointer to the remaining portion of the message.

A special paging process shown as 930 interacts with the queue 899. The paging process adjusts the different parts of each message so that messages which need delivery in the next few cycles are always accessible. The paging process operates according to rules in strategy base 932. The queue is also reordered by a queue manager 936 which interacts with the delivery agent 938. The queues may be reordered as explained in the first embodiment.

The queue manager 936 is responsible for using the message delivery strategies in a strategy base 932 in order to determine what messages will be sent next. The strategy rules 932 define the strategy for the next delivery. Example rules may include, for example, in a normal situation, choose the oldest queue or the oldest message, other rules can take into account "how fast is a recipient accepting the data"; "do any messages have special urgency marked in their metadata", "is there some kind of special strategy for the domain call", "does quality of service require sending", and the like.

The message transfer agent 800 may communicate with a message user agent 940 to inject the messages into the message transfer agent. The message user agent is responsive to the headers in the message such as "from" and "to", in order to route these messages appropriately.

For example, one message user agent such as 940 may be connected to multiple message transfer agents, and may route the messages to the transfer agents based on the contents of the queue.

Each new message is added to the queue 900, and the queue manager 936 decides based on information in the strategy base, whether only the pointer to the message will be maintained in local storage, or whether the entire message will be maintained. The queue manager 936 also manages the messages within the queue.

The delivery agent 938 works with the queue manager 936. Queue manager 936 determines a message delivery strategy. For example, for each delivery cycle, the agent along with the queue manager determines the best load to deliver based on which messages are available for delivery, and how many messages are being sent, for example, to the same location. The delivery agent and queue manager look a number of cycles ahead to maintain the information which will be sent in the local storage.

An important feature is that, unlike the message queues in the first embodiment which were a function of domain itself, these message queues become a function of the metadata describing the message. The metadata may include the domain information, but other factors may also be used in forming the queues.

Figure 10:
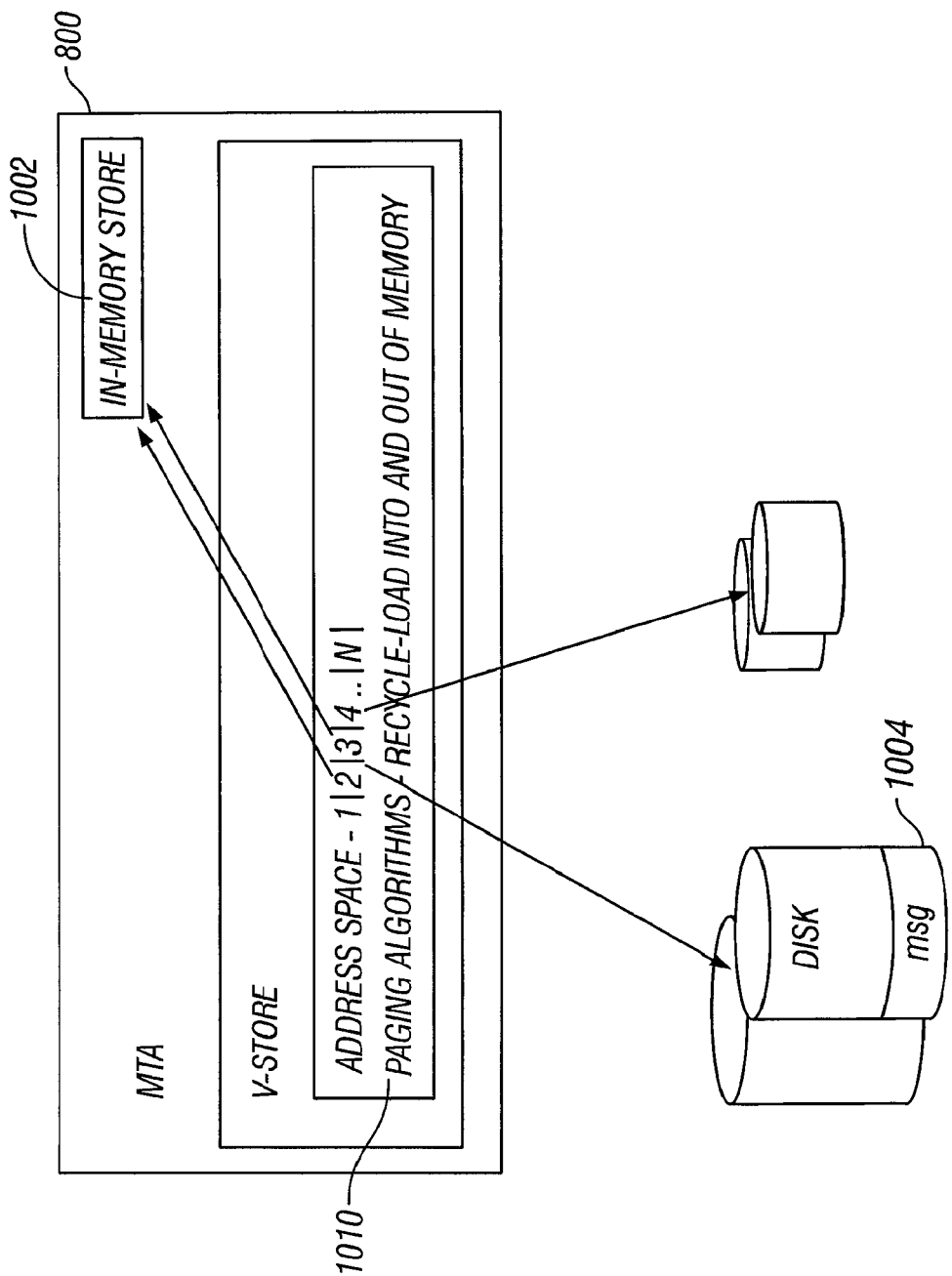
FIG. 10 shows a block diagram of the message transfer agent and its interface with the virtual storage.

The virtual storage is a virtual device spanning memory and disk storage. FIG. 10 illustrates how certain messages such as 1002 are stored in local memory and are directly accessible. The other types of messages such as 1004 are stored on disk and can be retrieved, but require additional resources and/or time to deliver. The virtual storage is effectively a memory addressing scheme that encompasses both the memory and the disks. All pages, however, are mapped to the virtual storage shown as 1010. The virtual storage 1010 points to either the local memory storage 1002 and/or the remote memory storage 1004, to describe each message. When access is required, the required page is brought into memory.

Moreover, each item of information in the virtual storage 1010 includes a virtual storage handle in the form of metadata. The virtual storage handle determines the message deliverability state, the message storage information that describes where the message actually stored, as well as details about the message that determine its deliverability.

This file system enables the queues to exist as data structure abstractions for storing the memory message before the delivery agent 938 readies the message for delivery. The queues use the virtual memory namespace 1010 for storage, and the queuing function can therefore be formed as pointers to the messages.

The queuing function can be based on domain name, or can be more complex, such as virtual server. Queues can also be organized by quality of service guarantees.

File System

Figure 11:
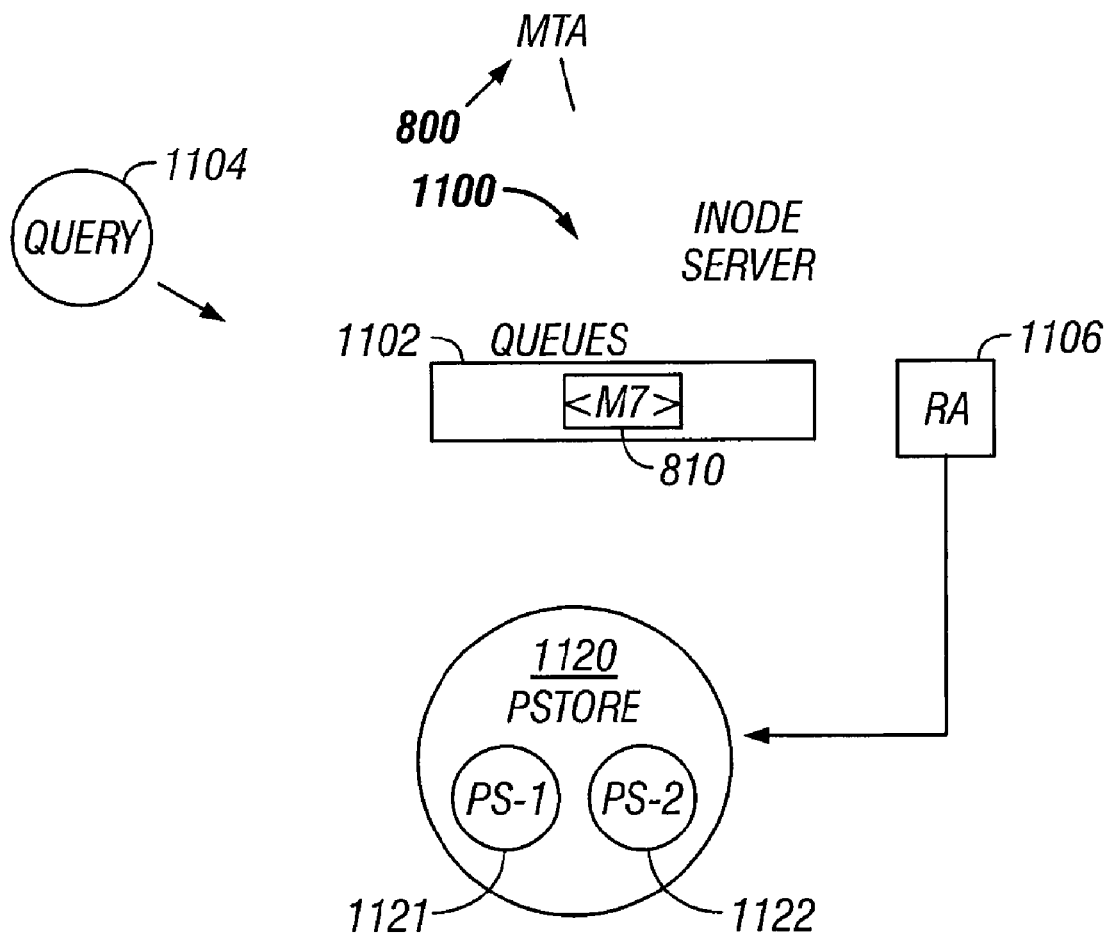
FIG. 11 shows the block diagram of how the message transfer agent interfaces with the Inode server and the physical store.

The interaction between the various parts forming the file system is shown in further detail in FIG. 11. The file system is used to effect the virtual storage and allow both persistent-local storage and nonpersistent-remote storage. The file system also provides query mechanisms for the memory transfer agent. The file system also divides the message, and allows separate handling of the different message parts.

An "Inode" server 1100 forms the master information server controlling the access to and formation of the messages. The Inode server is informed each time that any change to any message is made. The Inode server includes a complete list/of every message in local storage. The Inode server may organize the messages within the queue structure formed within the Inode server shown as 1102. A query function shown as 1104 allows querying the messages according to certain constraints.

A recovery agent 1106 monitors changes to messages, and stores information allowing recovery in case of system failure.

The physical store 1120 forms a physical remote storage device that is independent from the Inode server system. The recovery agent 1106 communicates with the physical store 1120, and journals all changes made to the P store, on the Inode server. The physical store shown as 1120 may include a number of subsystems shown as physical store I 1121; and physical store II 1122.

This system allows any number of message transfer agents and any numbers of Inode servers and/or pstores.

The workflow of message storage operates as shown in the flowchart of FIG. 12. At 1201, the Inode server is started. Multiple physical storage units register with the Inode server at 1210. At 1220, a new message is received from the message transfer agent 800. The message transfer agent pushes the message into the queue, and flags a request for disk storage at 1220. At 1230, during the next storage cycle, messages which are to be sent to persistent storage are selected, and the Inode server selects a location for storage. Subsequently, at 1235, the Inode server creates metadata indicative of the stored location, and stores the actual message into that storage location, and puts the metadata into the queue in place of the message information. At 1240, the message transfer agent writes the message to the indicated storage and receives a persistent storage confirmation ID which is given to the Inode server at 1245. A log is kept at 1250, as a checkpoint for recovery can be obtained.

The queue manager 936 is associated with the message transfer agent, and operates to monitor request patterns on the queues. It manages the certain queue state depending on a policy for the MTA. For example, each MTA may have a nominal queue size of 500 MB or some other size.

The queue manager operates according to the flowchart of FIG. 13. At 1300, it forms the queues.

At 1320, the queue manager uses the rules in strategy base 932 to attempt to predict the request patterns for the next one or two cycles. At 1325, it commands the queue workers to prefetch messages.

The queue manager requests the messages from the Inode server at 1330. Examples of such queries could include get a message with ID number 123, get 10 Hotmail messages or the like at 1330. The Inode server returns the pstore address at 1340 and the MTA retrieves message from specified pstores as required by queue management/resource pool function at 1350. Each message includes information indicative of the actual storage state. Once the message is delivered to an intended mailbox, then its body can be deleted from the pstore and appropriate updates to Inode server can be carried out.

The message transfer agent queue therefore becomes redundant information that is already available in the Inode server queue. If MTA information is lost, then only transactional information such as the DNS state and the like is lost. The queue can be reconstituted immediately on restart.

An important feature of this architecture is the recovery mode. The message transfer agent includes a message queue 810 as described above. Data of each of these queues is also available in the Inode server. For example, the information which is referenced by the queue 810 shown in FIG. 8 is also "duplicated" by queue pointers 1102 shown in FIG. 11. Each time something changes in the message transfer agent 800, the MTA reports that change to the Inode server 820, which updates stored data which in turn reflects to appropriate Inode server queues. Certain transactional information, such as the DNS state, may be lost when the message transfer agent fails. However, if a message transfer agent fails, a new MTA can be started, and its queue is refilled immediately from the backup queue in the Inode server. At worst a message might be delivered twice, but no messages will be lost.

The Inode server stores the message metadata and the queues as described above. The recovery agent 1106 maintains all of this data as journal information and checkpoint information. Each element can be recovered, therefore.

The physical stores are interfaces implemented to provide persistent storage, e.g. hard disks, capabilities and could be any implementation of storage service such as RAID disks or anything similar. The system also implements the pstore interface in one of the provided components.

Figure 14:
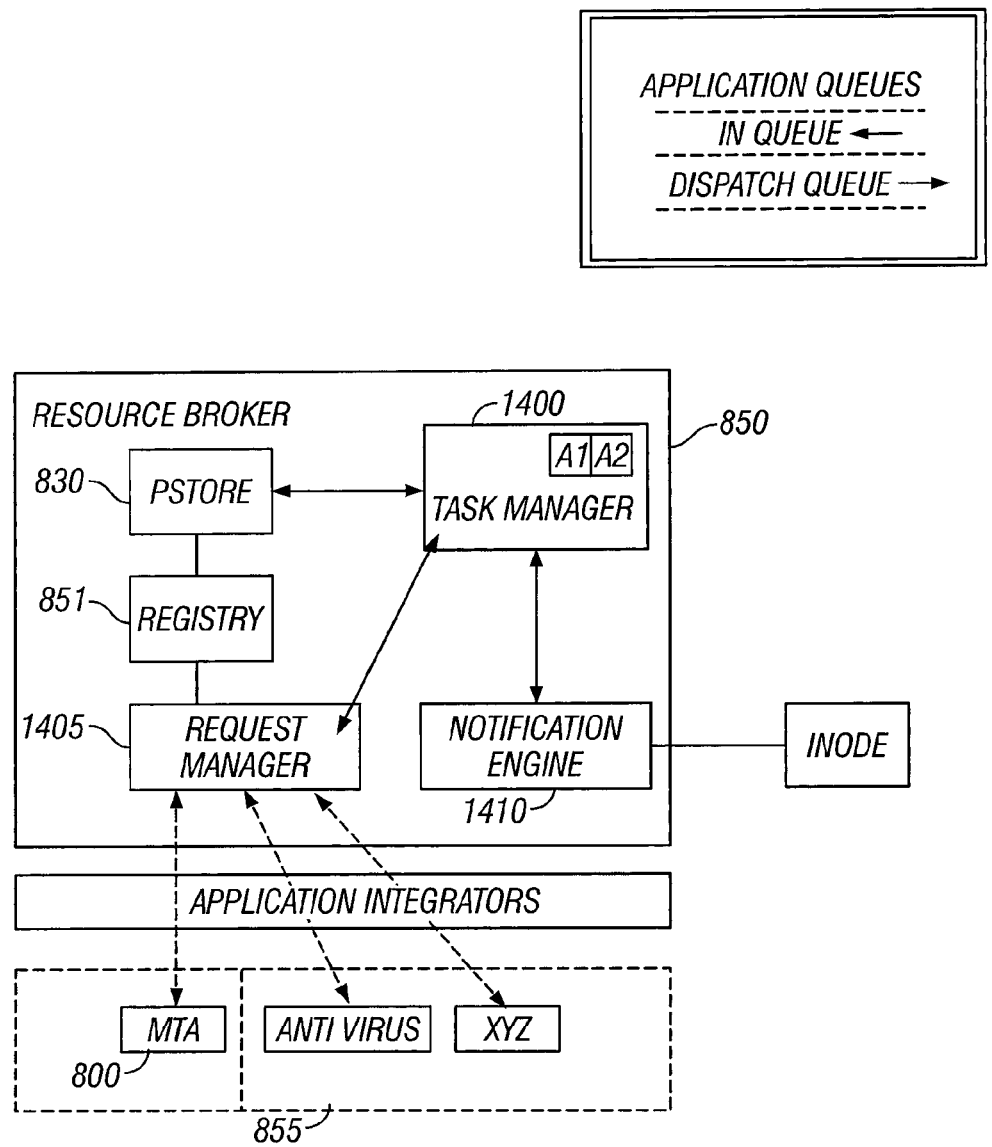
FIG. 14 shows a block diagram of the resource broker and its connection to the other structures.

A detailed block diagram of the resource broker is shown in FIG. 14. The resource broker 850 operates, as its name implies, to control access to the different resources in the system. The resource broker 850 is shown in FIG. 8 as being a separate unit, but may be part of the Inode server. The resource broker orchestrates different services and access within different modules. The resource broker shown as 850 represents a module that allows access to services 855. The resource broker includes an embedded resource registry shown as 851. The resource registry indicates which services are available in a given setup. For example, antivirus software could be one available resource, which can be registered in 851. The resource registry is a service that any resource can subscribe to, so if an MTA listens on a service, it will be aware of availability of anti-virus services, for example. An application requests services using the request manager 1405.

Other services may be used. For example, a quote of the day service may append such a quote to each email.

Each task may query the task manager 1400 for permission to access a specified resource. The task manager communicates with the request manager 1405 to coordinate the access. For example, access to the antivirus service is requested as task Al. When Al gets to the front of the task manager queue, the request is passed to the request manager 1405 that grants access to the antivirus service. When complete, the request manager notifies the task manager, which notifies the notification engine 1410. This is used to change the metadata associated with the message, to indicate that the task has been completed.

Similar operations occur with access to Pstore 830, and with other accesses. The task manager 1400 may allow the services to be asynchronously granted.

Having described all the individual parts, it can be seen that each of these individual parts act together, along with workflow definitions in the flow manager to determine the business process of organization e.g. to receive mails, check for viruses, sign communications, and send communications.

Figure 15:
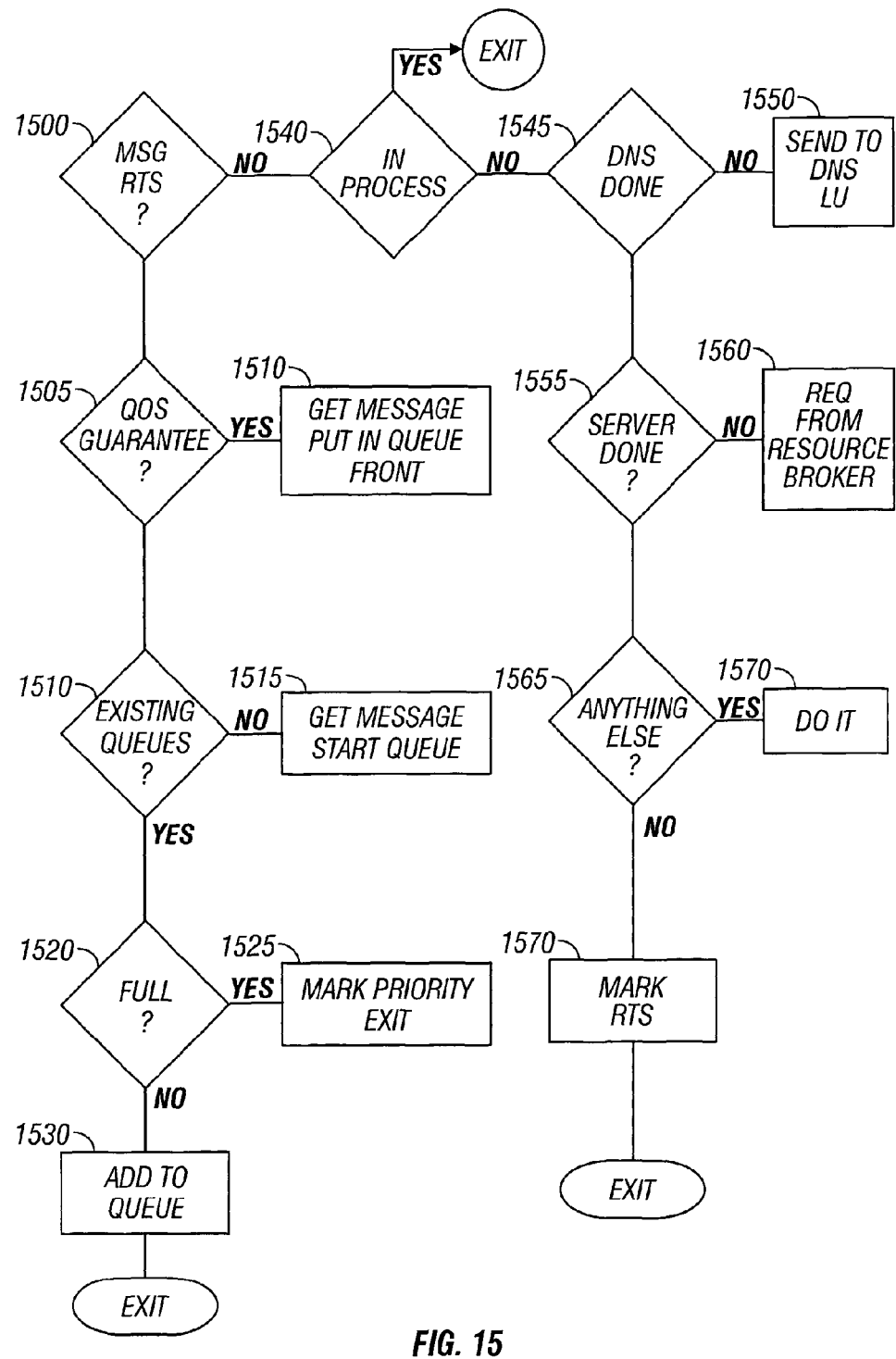
FIG. 15 shows a block diagram/flowchart of the operation of the strategy base.

A simplified flowchart of the operation carried out by the delivery agent to find the next message to be retrieved and added to the queues for local delivery, is shown in FIG. 15. It should be understood that FIG. 15 shows exemplary operations which can be carried out; and that different strategies in the strategy database can be used to modify these operations. Each of the blocks in FIG. 15 can be a rule associated with a priority, and different rule/different priorities can be used.

At 1500, the process begins with an initial step of determining if a particular message has its ready to send metadata set. If the answer is yes, then the message associated with the metadata is ready to send. Flow passes to 1505 which determines if the metadata indicates that there is a quality of service guarantee. If so, the message is immediately added to the ready to send queue (treated as imminent), in front of all other messages which do not have a comparable level of quality of service guarantee. This effects the different levels of quality of service guarantees.

If there is no quality of service guarantee, 1510 determines if there is an existing queue for the same domain, and if not, the message is added to a new queue at 1515. If there is an existing queue, 1520 determines if the queue is already full. If so, the priority of the message is incremented at 1525, and the process exits until the next time the message is handled. If the queue is not full at 1520, the message is added to the queue at 1530 and the process exits.

If the message is not ready to send at 1500, then 1540 checks to see if the message is "in process"; that is has been submitted to the resource broker for certain services to be carried out. If so, the process exits until a future time. If the message is not in process, then 1545 checks to determine if the DNS is complete. If not, the message is sent to the resource broker for DNS lookup at 1550. If DNS is complete, 1555 checks to see if all services which have been requested have been completed. If not, then those services are requested from the resource broker at 1560. 1565 checks to see if anything else remains undone, and if so, the action is requested at 1570. If all services are complete, the metadata is marked as ready to send at 1570.

All of the above checks can simply be checks of metadata, since the metadata stores the condition and state of the message.

The message is then ready to send. At this point, the message transfer agent 800 connects to the license server 840 to verify whether the system is authorized for further sending of messages. The license server is also listening on the TCP port 802, so it can determine the state of sending of the various messages. Different operations which can be done by the license server are to determine if the license is valid. The license may be valid for unlimited uses, or for certain processes; certain IP addresses or the like. Therefore, the determination of whether the license is valid can involve the determination of how many messages have been sent, how many processes are active, and which IP address or IP addresses are active.

The license server stores a list of rules shown as 841. These rules can be changed on the licensed server, by an authorized rule change or process. The rules are preferably signed or encrypted to avoid hacking of the license server. For example, one possible rule may be a query to the message transfer agent of "how many processes are you running"? The license server can also be directly communicated with by the TCP port. This enables the activating someone based on complaints and maintains accountability for the number of e-mails that are sent.

Although only a few embodiments have been disclosed in detail above, other modifications are possible. All such modifications are intended to be encompassed within the following claims.

What is claimed is:

1. An e-mail system comprising:
    a non-persistent or random memory comprising a plurality of data nodes, each respective data node in the plurality of data nodes uniquely representing a corresponding e-mail in a plurality of e-mails that are to be sent over a network by the e-mail system to one or more destinations;
    an input handler, wherein the input handler comprises instructions for:
        (i) storing a portion of an incoming e-mail in a first location in persistent storage that is accessible by the e-mail system,
        (ii) digesting the incoming e-mail into a data node representing the incoming e-mail, wherein the data node includes a pointer to the first location and metadata that represents a state of processing of the incoming e-mail, and
        (iii) adding the data node to the plurality of data nodes in said non-persistent or random memory; and
    an e-mail processing element, wherein the e-mail processing element comprises instructions for:
        (i) reading a first data node, in said plurality of data nodes,
        (ii) determining a next action for delivery of the corresponding e-mail based at least partly on said metadata in the first data node,
        (iii) reconstructing the corresponding e-mail from the first data node and the portion of the e-mail at a first location in persistent storage identified by the pointer to the corresponding e-mail that is in the first data node, and
        (iv) sending the corresponding e-mail over a network to the destination domain specified by the first data node.

2. A system as in claim 1, wherein said metadata includes a quality of service guarantee, and said e-mail processing element determines a priority for e-mail processing based on said quality of service guarantee metadata.

3. A system as in claim 1, wherein said metadata indicates a state of asynchronous processing of the e-mail, and said e-mail processing element determines whether the e-mail is ready for delivery based on said state of asynchronous processing.

4. A system as in claim 3, wherein said asynchronous processing is a state of DNS lookup, where said metadata indicates the state of DNS lookup, and said e-mail processing element determines whether the message is ready for sending based on said state of said DNS lookup.

5. A system as in claim 3, wherein said asynchronous processing includes an indication of whether a specified service has been requested for the e-mail.

6. A system as in claim 5, wherein said specified service is an antivirus check.

7. A system as in claim 5, wherein said metadata also includes an indication of whether the service has been completed.

8. A system as in claim 3, wherein said asynchronous processing includes an indication of whether other e-mails need to be sent to recipient before the e-mail prior to this e-mail.

9. A system as in claim 1, wherein the input handler further comprises instructions for:
- storing in non-persistent or random memory a first amount of information describing imminent messages, which are more likely to be sent; and
- storing a second amount of information in non-persistent or random memory describing non-imminent messages which are less likely to be sent,
- wherein the second amount of information stored in non-persistent or random memory is less than the first amount of information stored in non-persistent or random memory.

10. A system as in claim 9, wherein each message includes a message body, message routing information, and said metadata.

11. A system as in claim 10, wherein said metadata includes service metadata that describes operations that need to occur to the message.

12. A system as in claim 10, wherein said metadata includes business metadata that defines information about the form of the message.

13. A system as in claim 10, wherein said metadata includes history metadata which describes a history of processing of the message.

14. A system as in claim 10, wherein said processor includes a message handling agent that obtains information about the e-mail from the metadata, and defines information regarding queues of e-mails.

15. A system as in claim 9, wherein said processor operates to determine queues of e-mails, said queues representing e-mails to be sent to locations which have certain common features.

16. A system as in claim 15, wherein said processor further operates to determine a rate of sending to said locations, and to manage the queues based on information indicative of said rate of sending.

17. A system as in claim 9, wherein said metadata represents a priority of sending of the message.

18. A system as in claim 9, wherein said metadata represents a quality of service associated with the message.

19. A system as in claim 9, wherein said metadata represents a virtual identification information about the message.

20. A system as in claim 9, wherein said metadata represents a service to be carried out on the message.

* * * * *